US009964457B2

(12) United States Patent
Duff et al.

(10) Patent No.: US 9,964,457 B2
(45) Date of Patent: May 8, 2018

(54) ROTARY FORCE DIAGNOSTIC TOOLS AND METHODS

(71) Applicant: Honda Motor Co., Ltd., Minato-ku, Tokyo (JP)

(72) Inventors: Douglas J. Duff, Marysville, OH (US); Andrew M. Sweigart, Grove City, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 67 days.

(21) Appl. No.: 14/804,183

(22) Filed: Jul. 20, 2015

(65) Prior Publication Data

US 2017/0023424 A1    Jan. 26, 2017

(51) Int. Cl.
| G01N 3/00 | (2006.01) |
| G01L 5/22 | (2006.01) |
| B62D 15/02 | (2006.01) |
| G01D 5/347 | (2006.01) |
| G01D 5/14 | (2006.01) |
| B62D 5/04 | (2006.01) |

(52) U.S. Cl.
CPC .......... G01L 5/221 (2013.01); B62D 5/0457 (2013.01); B62D 15/021 (2013.01); G01D 5/14 (2013.01); G01D 5/3473 (2013.01)

(58) Field of Classification Search
CPC ....... G01L 5/221; G01L 5/021; B62D 15/021; G01D 5/14; G01D 5/3473; G01D 5/5473
USPC .............................. 73/788, 862.21
See application file for complete search history.

(56) References Cited

U.S. PATENT DOCUMENTS

| 3,556,045 | A |   | 1/1971  | Williams |
| 3,889,527 | A |   | 6/1975  | Wallace |
| 4,281,538 | A | * | 8/1981  | Dudek ............... B25B 23/1456 173/182 |
| 4,386,532 | A | * | 6/1983  | Benjamin ............ B25J 13/08 33/535 |
| 4,742,720 | A |   | 5/1988  | Storck |
| 4,803,629 | A | * | 2/1989  | Noto .................. B62D 15/0245 180/446 |
| 5,123,497 | A |   | 6/1992  | Yopp et al. |
| 5,283,508 | A | * | 2/1994  | Komatsu ............. G05B 19/409 318/560 |
| 5,610,577 | A |   | 3/1997  | Hwang |
| 6,089,344 | A |   | 7/2000  | Baughn et al. |
| 6,114,949 | A |   | 9/2000  | Schmitz et al. |
| 6,155,106 | A |   | 12/2000 | Sano |
| 6,219,603 | B1| * | 4/2001  | Yamamoto ............ B62D 5/008 180/444 |
| 6,253,630 | B1|   | 7/2001  | Hacker |
| 6,305,217 | B1|   | 10/2001 | Mansfeld et al. |
| 6,510,750 | B2|   | 1/2003  | Schlabach et al. |
| 7,575,089 | B2|   | 8/2009  | Sherwin |
| 7,793,556 | B2|   | 9/2010  | Engel et al. |

(Continued)

*Primary Examiner* — Max Noori (74) *Attorney, Agent, or Firm* — Arent Fox LLP (57) ABSTRACT

An apparatus includes a force sensor including a housing and a support rotatably coupled to the housing. The housing also includes a handle coupled to the support to rotate with the support. The handle is spaced apart from the housing to define a space between the housing and the handle. The apparatus further includes an angular position sensor disposed in the space between the housing and the handle to sense relative rotation between the housing and the handle.

21 Claims, 9 Drawing Sheets

(56) References Cited

U.S. PATENT DOCUMENTS

| | | |
|---|---|---|
| 8,473,160 B2 | 6/2013 | Kuramori |
| 2006/0011404 A1* | 1/2006 | Goto ................. B62D 6/002 180/402 |
| 2006/0243464 A1* | 11/2006 | Heinz ................. A61B 5/03 172/322 |
| 2008/0096445 A1* | 4/2008 | Nanami ............... B63B 35/731 440/1 |
| 2008/0251312 A1* | 10/2008 | Goto ................. B62D 6/003 180/446 |
| 2013/0294016 A1 | 11/2013 | Wilson et al. |
| 2014/0290386 A1 | 10/2014 | Wang et al. |
| 2015/0011830 A1 | 1/2015 | Hunter et al. |
| 2015/0366585 A1 | 12/2015 | Lemay et al. |

\* cited by examiner

ROTARY FORCE DIAGNOSTIC TOOLS AND METHODS

BACKGROUND

The subject matter disclosed herein relates to vehicle tests and, more particularly, to rotary force diagnostic tools and methods.

During manufacturing of a vehicle, components of the vehicle are tested to determine if the components function in accordance with industry and/or quality standards. For example, one or more characteristics and/or parameters of turn signals, windshield wipers, a steering wheel, brakes, an engine, and/or other components may be determined and/or analyzed.

SUMMARY

According to one aspect, an apparatus includes a force sensor to be coupled to a steering wheel of a vehicle. A handle is rotatably coupled to the force sensor to enable an amount of force applied to the handle to be sensed by the force sensor. An angular position sensor senses an angular position of the handle relative to a portion of the force sensor.

According to another aspect, an apparatus includes a force sensor including a housing and a support coupled to the housing. The housing also includes a handle rotatably coupled to the support. The handle is spaced apart from the housing to define a space between the housing and the handle. An angular position sensor is disposed in the space between the housing and the handle to sense relative rotation between the housing and the handle.

According to another aspect, a method includes coupling a diagnostic tool to a steering wheel. The diagnostic tool includes a force sensor, a handle rotatably coupled to the force sensor, and an angular position sensor coupled to at least one of the handle or the force sensor. The method also includes positioning the handle in a predetermined orientation and applying a force to the handle to rotate the steering wheel from a first position to a second position while substantially maintaining the handle in the predetermined orientation. The method further includes determining an angular position of the steering wheel via the angular position sensor and an amount of the force applied to the handle via the force sensor as the steering wheel rotates from the first position to the second position.

BRIEF DESCRIPTION OF THE DRAWINGS

Like reference numerals are used herein to refer to like components and/or systems.

DETAILED DESCRIPTION

Exemplary rotary force diagnostic tools and methods are disclosed herein. An exemplary rotary force diagnostic tool may be employed to determine an amount of force applied to rotate a rotary component (e.g., a steering wheel) from a first position to a second position. For example, as the rotary component rotates, the rotary force diagnostic tool may determine angular positions of the rotary component and a force applied to the rotary component at each of the angular positions. Thus, the rotary force diagnostic tool may indicate if the force applied to rotate the rotary component increases, decreases, and/or is substantially constant as the rotary component rotates from the first position to the second position.

In some embodiments, the rotary force diagnostic tool may include a fixture to removably couple the rotary force diagnostic tool to the rotary component. In some embodiments, the rotary force diagnostic tool includes a force sensor (e.g., a load cell) and an angular position sensor (e.g., a rotary encoder). The force sensor may be non-rotatably coupled to the fixture, and a handle may be rotatably coupled to the force sensor. The angular position sensor may be disposed between the force sensor and the handle to sense an angular position of the handle relative to the force sensor.

Figure 1:
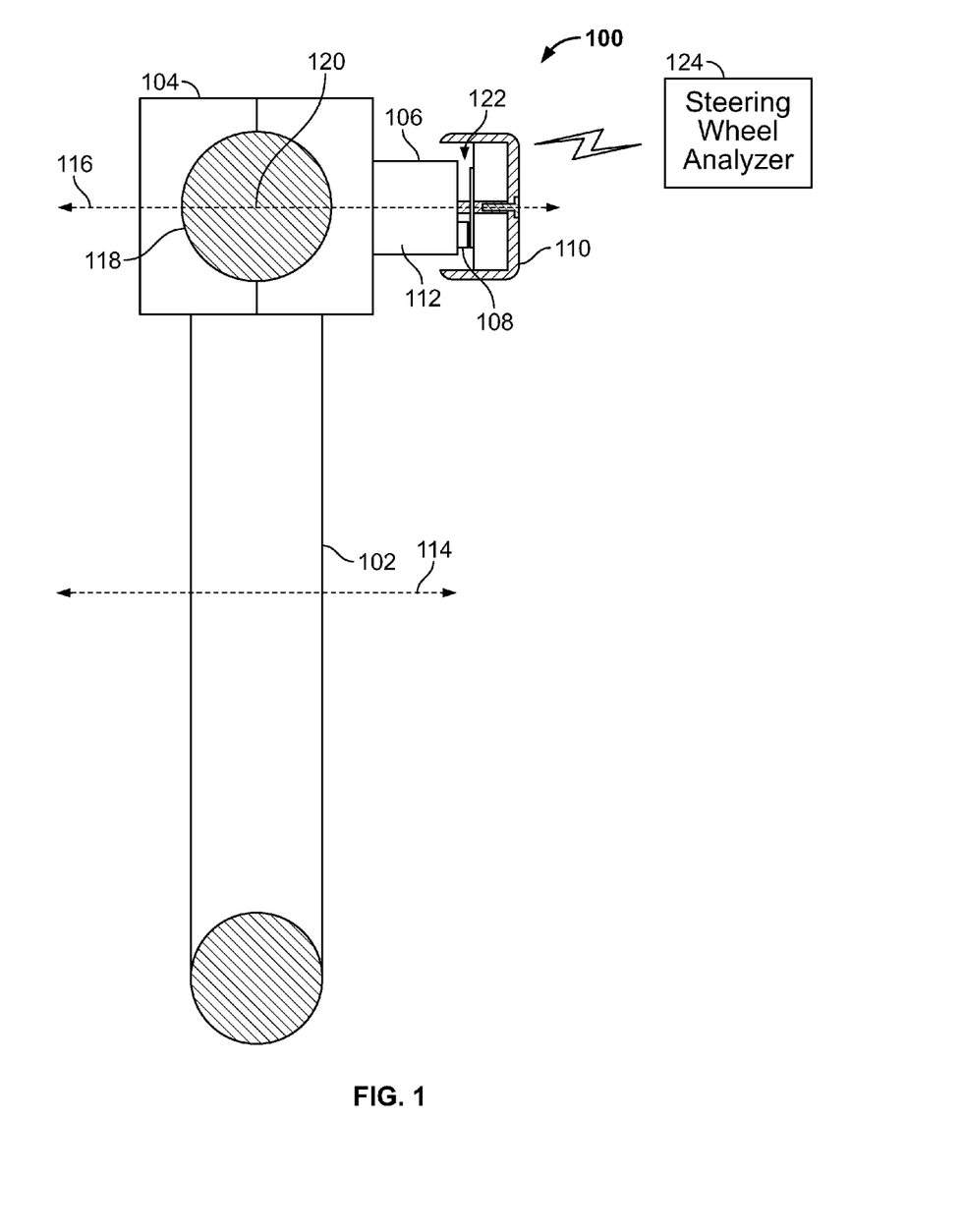
FIG. 1 is a schematic cross-sectional view of an exemplary rotary force diagnostic tool disclosed herein.

FIG. 1 is a schematic cross-sectional view of an exemplary rotary force diagnostic tool 100 disclosed herein. The rotary force diagnostic tool 100 of FIG. 1 is coupled to a steering wheel 102. Although the following embodiments are described in conjunction with the steering wheel 102, the rotary force diagnostic tools disclosed herein may be employed to determine a force to rotate any component that rotates, turns, and/or swivels such as, for example, a wheel or a seat. In the embodiment shown in FIG. 1, the rotary force diagnostic tool 100 includes a mount or fixture 104, a force sensor 106, an angular position sensor 108, and a handle 110.

Figure 2:
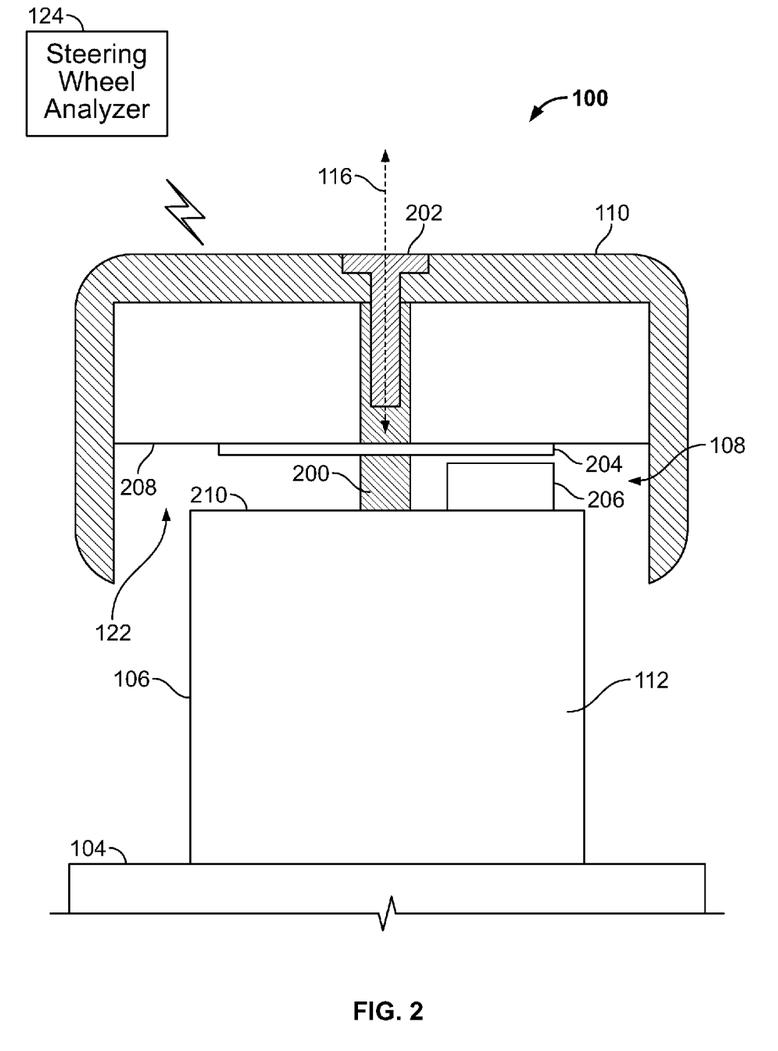
FIG. 2 is another schematic cross-sectional view of the exemplary rotary force diagnostic tool of FIG. 1.

The fixture 104 removably couples the rotary force diagnostic tool 100 to the steering wheel 102. In the embodiment of FIG. 1, the fixture 104 supports the force sensor 106, the angular position sensor 108, and the handle 110 on the steering wheel 102. The fixture 104 of FIG. 2 is coupled to the steering wheel 102 to enable the fixture 104 to rotate with the steering wheel 102 and substantially without movement relative to the steering wheel 102 (i.e., without any intended play or lost motion between the steering wheel 102 and the fixture 104).

The fixture 104 may be removably coupled to the steering wheel 102 in any suitable way. For example, the fixture 104 may clamp to the steering wheel 102, hook, clip, and/or grip onto the steering wheel 102, be tied to the steering wheel 102, employ one or more magnets to secure the fixture 104 to the steering wheel 102, and/or couple to the steering wheel 102 in one or more additional and/or alternative ways. In some embodiments, the fixture 104 couples to the steering wheel 102 in a nondestructive or harmless manner. For example, the fixture 104 may employ padding, one or more smooth contact surfaces, one or more mechanisms to prevent over-tightening of the fixture 104 onto the steering wheel 102, and/or one or more additional and/or alternative techniques and/or components to enable the fixture 104 to be coupled to and decoupled from the steering wheel 102 without permanently scratching, scraping, cutting, bending, denting, deforming, discoloring, and/or harming the steering wheel 102 in any additional and/or alternative ways.

The force sensor 106 of FIG. 1 includes a housing 112 coupled to the fixture 104 such that the force sensor 106 moves with the fixture 104 and substantially without movement relative to the fixture 104. Thus, the steering wheel 102, the fixture 104, and the housing 112 each rotate only about a first axis of rotation 114 when the rotary force diagnostic tool 100 is coupled to the steering wheel 102. In some embodiments, the first axis of rotation 114 is defined by a steering shaft of a steering column of a vehicle in which the steering wheel 102 is employed. The housing 112 may be coupled to the fixture 104 by one or more mechanical and/or chemical fasteners such as, for example, a bolt, a weld, a screw, a nail, glue, epoxy, a clip, and/or one or more additional and/or alternative fasteners.

In the embodiment shown in FIG. 1, the handle 110 is a cylindrical knob. However, the handle 110 may have any suitable shape and/or configuration such as, for example, an L-shape as described below with reference to FIGS. 4 and 5. The handle 110 is rotatably coupled to the housing 112 of the force sensor 106. In the embodiment of FIG. 1, the handle 110 rotates relative to the housing 112 about a second axis of rotation 116. Thus, as the steering wheel 102 rotates, the handle 110 may rotate about the first axis of rotation 114 and the second axis of rotation 116.

In the shown embodiment, the fixture 104 is coupled to the steering wheel 102 to orient the rotary force diagnostic tool 100 such that the second axis of rotation 116 is substantially parallel to the first axis of rotation 114. In other embodiments, the second axis of rotation 116 is not substantially parallel to the first axis of rotation 114. The perspective of FIG. 1 is from a viewpoint substantially perpendicular to a plane passing through the first axis of rotation 114 of the steering wheel 102. The steering wheel 102 has a circular cross-sectional area 118 from the perspective of FIG. 1. In other embodiments, the steering wheel 102 has other cross-sectional shapes (e.g., rectangular, polygonal, etc.). In the embodiment of FIG. 1, the fixture 104 is coupled to the steering wheel 102 to orient the rotary force diagnostic tool 100 such that the second axis of rotation 116 passes through (i.e., intersects) a center 120 of the cross-sectional area 118 of the steering wheel 102. In other embodiments, the second axis of rotation 116 does not pass through the center 120 of the cross-sectional area 118 of the steering wheel 102.

In the embodiment of FIG. 1, the handle 110 is spaced apart from the housing 112 of the force sensor 106 along the second axis of rotation 116. The angular position sensor 108 is disposed in a space 122 between the housing 112 and the handle 110. The angular position sensor 108 senses relative movement (i.e., rotation) between the housing 112 and the handle 110, which corresponds to relative movement between the handle 110 and the steering wheel 102. For example, during a steering wheel test, a user may grip the handle 110 and apply a force to the handle 110 to rotate the steering wheel 102. In some embodiments, as the steering wheel 102 rotates, the user maintains the handle 110 in a predetermined orientation such as, for example, a predetermined angular position relative to a reference position. As a result, the handle 110 rotates relative to the housing 112 as the steering wheel 102 rotates. The angular position sensor 108 senses the relative movement between the housing 112 and the handle 110. Further, as the user applies the force to the handle 110 to rotate the steering wheel 102, the force sensor 106 senses an amount of force applied by the user to the handle 110.

In the embodiment of FIG. 1, the force sensor 106 and the angular position sensor 108 are communicatively coupled to a steering wheel analyzer 124. In some embodiments, the force sensor 106 communicates force information to the steering wheel analyzer 124, and the angular position sensor 108 communicates angular position information to the steering wheel analyzer 124. In the embodiment of FIG. 1, the force sensor 106 and/or the angular position sensor 108 are wirelessly communicatively coupled to the steering wheel analyzer 124. In other embodiments, one or more wires communicatively couple the force sensor 106 and/or the angular position sensor 108 to the steering wheel analyzer 124. As described in greater detail below with reference to FIG. 7, the steering wheel analyzer 124 may determine an amount of force applied to the handle 110 to rotate the steering wheel 102, an angular position of the steering wheel 102, and/or additional and/or alternative information based on the force information and/or the angular position information.

FIG. 2 is a schematic cross-sectional view of the rotary force diagnostic tool 100 of FIG. 1. In the embodiment of FIG. 2, the force sensor 106 is a load cell. In other embodiments, the force sensor 106 may be any suitable type of force sensor. The force sensor 106 of FIG. 2 includes a support 200 non-rotatably coupled to the housing 112. In the embodiment of FIG. 2, the support 200 is a cylindrical stem or shaft. In other embodiments, the support 200 may have any suitable shape and/or configuration. The support 200 extends from the housing 112 toward the handle 110 and away from the fixture 104. The handle 110 is rotatably coupled to the support 200 via a fastener 202 (e.g., a rivet) to enable the handle 110 to rotate relative to the support 200 and, thus, the housing 112. In the embodiment of FIG. 2, the fastener 202 defines the second axis of rotation 116 of the handle 110 relative to the housing 112.

The support 200 is operatively coupled to the housing 112 to enable the force sensor 106 to sense an amount of force applied to the support 200. For example, when the user applies a force to the handle 110 to rotate the steering wheel 102, the force is transferred to the support 200, which may change an electrical output of the force sensor 106 such as, for example, a voltage or an electrical resistance. The electrical output may then be communicated to the steering wheel analyzer 124 as the force information.

The angular position sensor 108 senses rotation of the handle 110 relative to the housing 112. In the shown embodiment, the angular position sensor 108 is a rotary encoder. In other embodiments, the angular position sensor 108 may be any suitable type of rotary encoder such as, for example, an optical rotary encoder, a magnetic rotary encoder, an absolute rotary encoder, an incremental rotary encoder, and/or any other suitable type of rotary encoder. In other embodiments, the angular position sensor 108 may be implemented using one or more additional and/or alternative types of sensors.

In the shown embodiment, the angular position sensor 108 includes a rotary encoder wheel 204 and a rotary encoder sensor 206. In some embodiments, the rotary encoder sensor 206 senses an angular position of the rotary encoder wheel 204 based on one or more indicators of the rotary encoder wheel 204 such as, for example, an optical pattern, magnetic fields, and/or one or more additional and/or alternative types of indicators. In the embodiment of FIG. 2, the rotary encoder wheel 204 is disposed on the handle 110. More particularly, the rotary encoder wheel 204 of FIG. 2 is disposed about the support 200 (e.g., the support 200 passes through an aperture of the rotary encoder wheel 204) and is coupled to a first face or surface 208 of the handle 110 opposing a second face or surface 210 of the housing 112 of the force sensor 106. In some embodiments, the handle 110 does not include the rotary encoder wheel 204 and the indicators are disposed directly on the first surface 208. For example, an optical pattern readable by the rotary encoder sensor 206 may be printed onto the first surface 208. The rotary encoder sensor 206 is disposed on and coupled to the second surface 210 of the housing 112 of the force sensor 106. In other embodiments, the rotary encoder sensor 206 is disposed on the first surface 208 of the handle 110, and the rotary encoder wheel 204 and/or the indicators are disposed on the second surface 210 of the housing 112. In some embodiments, the rotary encoder wheel 204 and/or the rotary encoder sensor 206 may be disposed on other locations and/or in other orientations.

Figure 3:
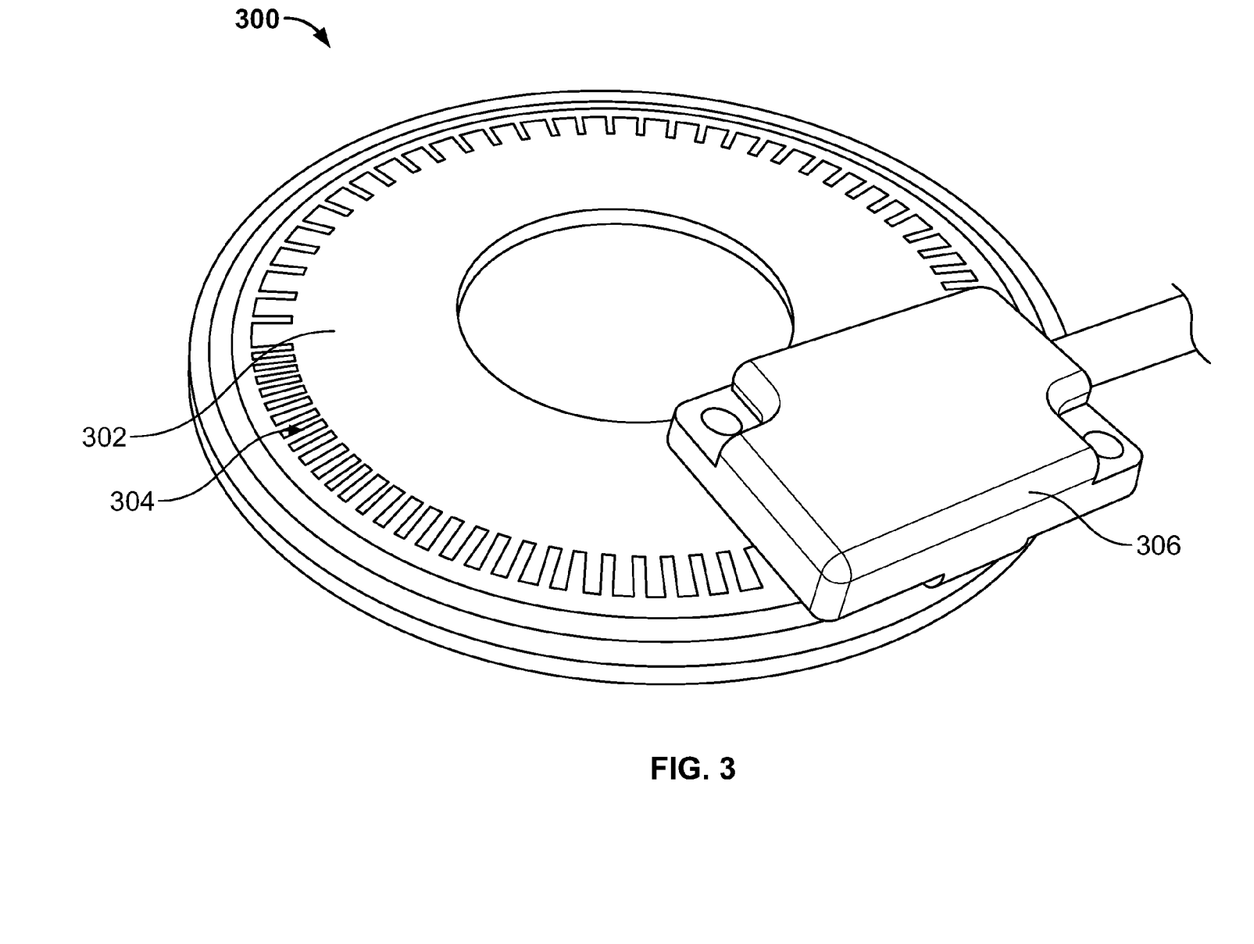
FIG. 3 is perspective view of an exemplary rotary encoder, which may be used to implement the exemplary rotary force diagnostic tool of FIGS. 1 and 2.

FIG. 3 is a perspective view of an exemplary rotary encoder 300, which may be used to implement the angular position sensor 108 of FIGS. 1 and 2. In the embodiment of FIG. 3, the rotary encoder 300 is an absolute rotary encoder such as, for example, a Micro Motion Absolute™ rotary encoder sold by MicroE Systems®. The rotary encoder 300 of FIG. 3 may have a sensing resolution of between about 5 micrometers to about 1.2 nanometers when the handle 110 is moving up to a maximum angular speed of 10 meters per second relative to the housing 112. However, the above-noted resolution is merely an example and, thus, rotary encoders having other resolutions may be employed without departing from the scope of this disclosure. In the embodiment of FIG. 3, the rotary encoder 300 includes a rotary encoder wheel 302 having a plurality of indicators 304. The rotary encoder 300 also includes a rotary encoder sensor 306, which optically senses one or more of the indicators 304 to generate angular position information.

Figure 4:
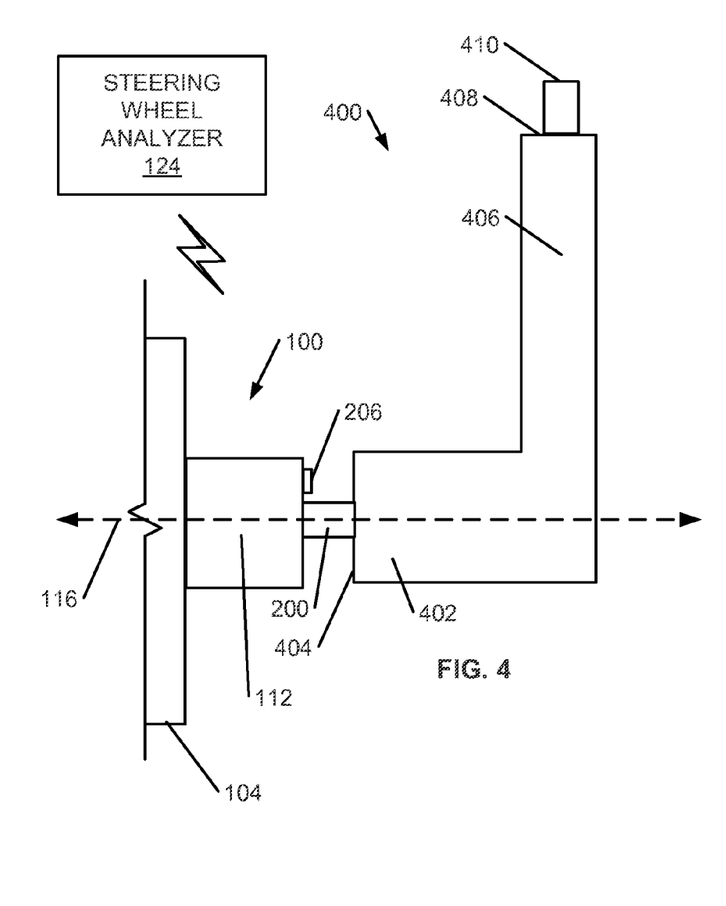
FIG. 4 is a schematic side view of the exemplary rotary force diagnostic tool of FIGS. 1 and 2 employing an L-shaped handle.

FIG. 4 is a side view of the rotary force diagnostic tool 100 employing another exemplary handle 400. In the shown embodiment, the handle 400 is L-shaped. Thus, the handle 400 includes a first section 402 defining a first end 404 of the handle 400 and a second section 406 defining a second end 408 of the handle 400. The first section 402 is substantially perpendicular to the second section 406. In other embodiments, the handle 400 may have any suitable shape and/or configuration. For example, the handle 400 may be curved, X-shaped, and/or any other suitable shape and/or configuration. In the embodiment of FIG. 4, the first end 404 is rotatably coupled to the support 200 of the force sensor 106. As described in more detail with reference to FIG. 5, the handle 400 includes a visual indicator 410 to assist a user of the rotary force diagnostic tool 100 in maintaining the handle 400 in a predetermined orientation while rotating the steering wheel 102 via the handle 400.

Figure 5:
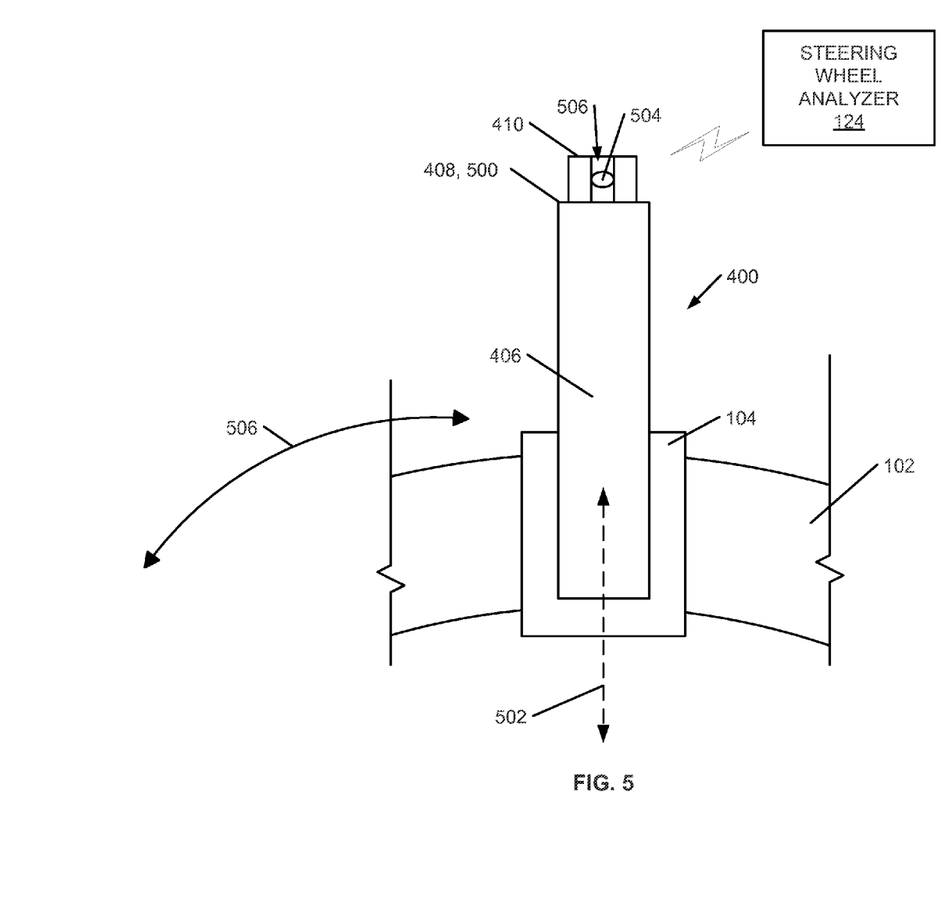
FIG. 5 is a schematic front view of the exemplary rotary force diagnostic tool of FIGS. 1 and 2 employing the L-shaped handle of FIG. 4.

FIG. 5 is a front view of the rotary force diagnostic tool 100 employing the handle 400 of FIG. 4. In the embodiment of FIG. 5, the visual indicator 410 is a level (e.g., a bubble level) disposed on a surface 500 defining the second end 408 of the handle 400. During a steering wheel test employing the rotary force diagnostic tool 100 of FIG. 5, the user maintains the handle 400 in a predetermined orientation in which the surface 500 of the handle 400 is substantially horizontal to Earth or a support surface (e.g., a floor). In the embodiment of FIG. 5, the predetermined orientation is also an orientation in which a longitudinal axis 502 of the second section 406 of the handle 400 is substantially vertical relative to Earth. The user may visibly monitor a bubble 504 inside the visual indicator 410 to assist the user in maintaining the handle 400 in the predetermined orientation as the user applies a force to the handle 400 to rotate the steering wheel 102 in a first direction (e.g., clockwise) or an opposite second direction (e.g., counterclockwise) as indicated by arrow 506. For example, the user may maintain handle 400 in the predetermined orientation by maintaining the bubble 504 in a middle or central section 506 of the visual indicator 410 as the steering wheel 102 rotates.

In some embodiments, the rotary force diagnostic tool 100 may be calibrated before conducting a steering wheel test. For example, a reference position of the angular position sensor 108 may be set when the handle 400 and the steering wheel 102 are in respective predetermined positions. For example, the reference position may be set by zeroing the angular position sensor 108 when the second section 406 of the handle 400 is substantially vertical and the steering wheel 102 is in a straightened or neutral position. The angular position sensor 108 may then sense the angular position of the handle 400 relative to the reference position as the steering wheel 102 rotates relative to the handle 400. As used in this disclosure, the steering wheel 102 is in the straightened or neutral position when the steering wheel 102 is positioned such that wheels of a vehicle steered via the steering wheel 102 are oriented to direct the vehicle in a substantially straight line on a substantially level, smooth planar surface. In other embodiments, the reference position of the angular position sensor 108 may correspond to other predetermined positions of the handle 400 and/or the steering wheel 102.

Figure 6:
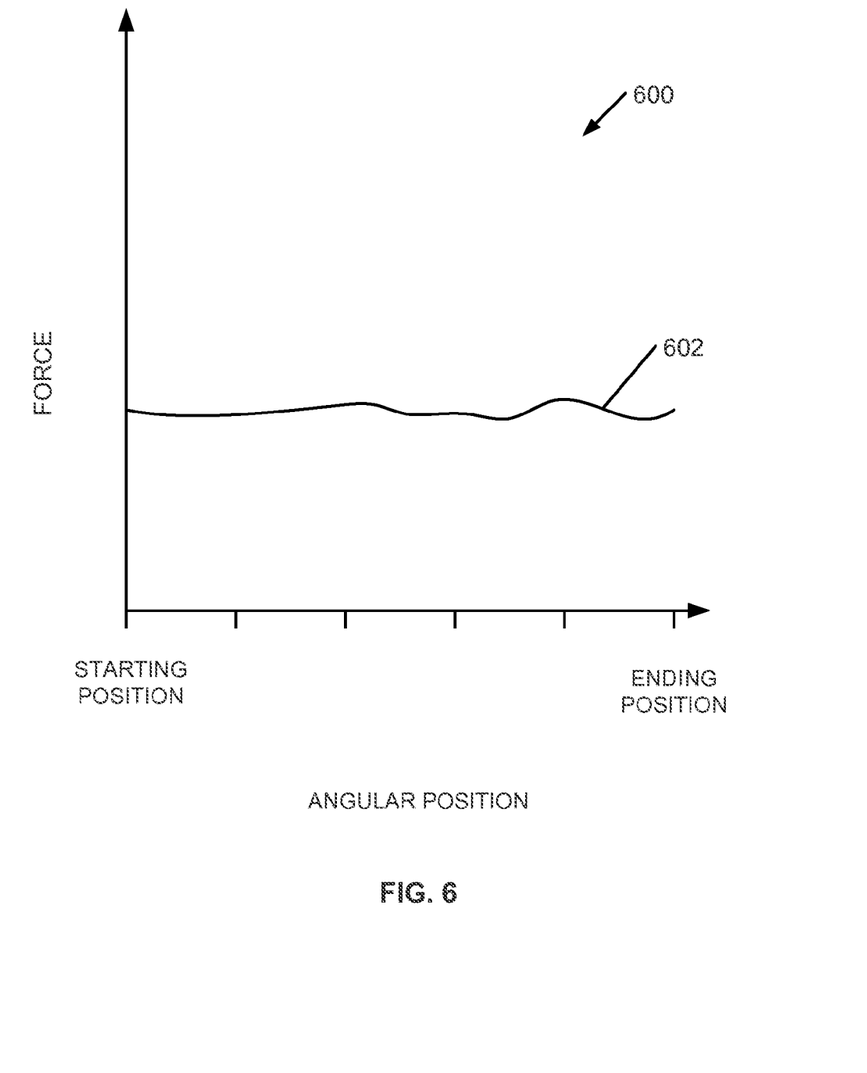
FIG. 6 is a graph of an exemplary force profile of a steering wheel in accordance with the teachings of this disclosure.

FIG. 6 is a graph 600 illustrating an exemplary force profile 602 of the steering wheel 102 generated by the exemplary steering wheel analyzer 124 of FIGS. 1, 2, 4, and 5 based on force information and angular position information generated via the rotary force diagnostic tool 100. During a steering wheel test, the user rotates the steering wheel 102 from a first position to a second position by applying force to the handle 400 of the rotary force diagnostic tool 100. In some embodiments, the user rotates the steering wheel 102 at a substantially constant angular speed from the first position to the second position while substantially maintaining the handle 400 in the predetermined orientation. As the steering wheel 102 rotates from the first position to the second position, the force sensor 106 senses amounts of force applied to the steering wheel 102, and the angular position sensor 108 senses angular positions of the handle 400 relative to the housing 112. As a result, the force sensor 106 and the angular position sensor 108 communicate force information and position information, respectively, to the steering wheel analyzer 124. Based on the force information and the position information, the steering wheel analyzer 124 associates (e.g., matches) positions of the steering wheel 102 with forces applied to the handle 400 at each of the positions to generate the force profile 602. In the embodiment of FIG. 6, the force profile 602 is a plot of the forces applied to the handle 400 over the positions of the steering wheel 102 as the steering wheel 102 moves from the first position (e.g., a starting position) to the second position (e.g., an ending position). The force profile 602 may indicate, for example, if a force applied to rotate the steering wheel 102 is substantially constant, increases, and/or decreases as the steering wheel 102 moves from the first position to the second position.

Figure 7:
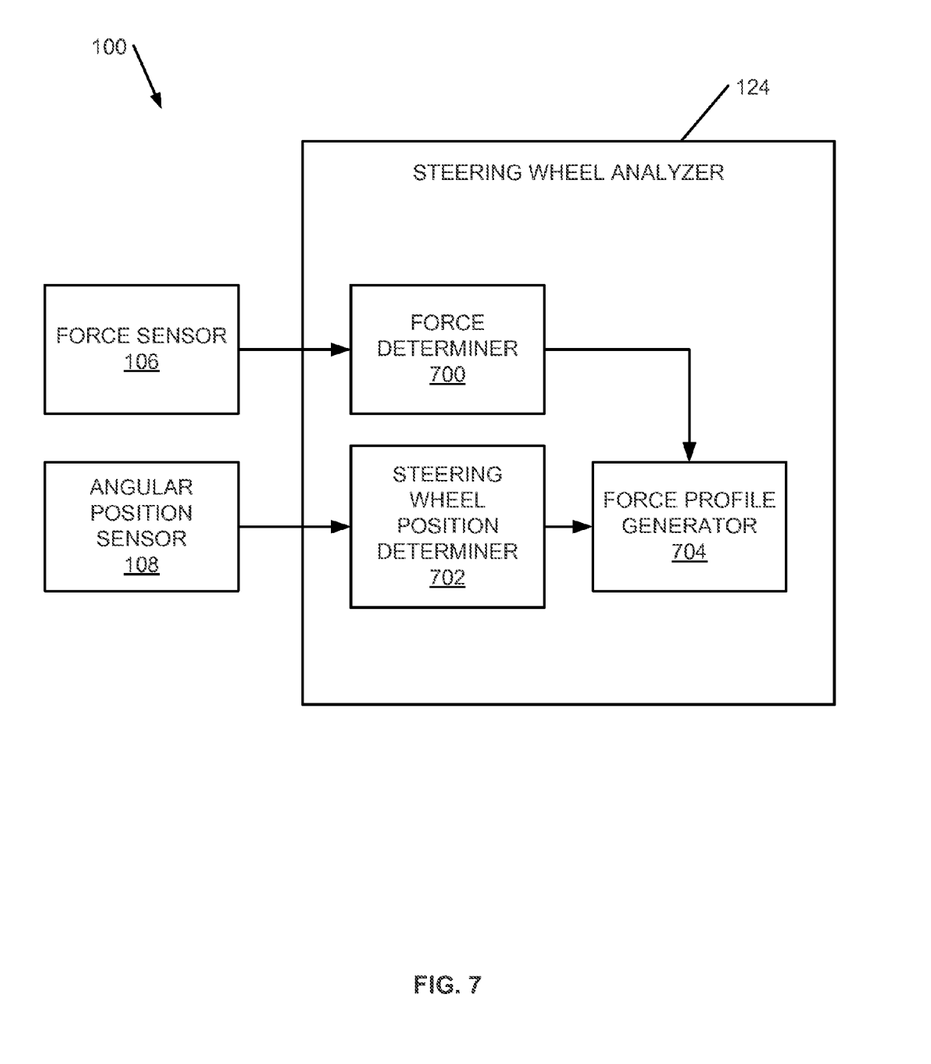
FIG. 7 is a block diagram of an exemplary steering analyzer, which may be employed to generate the force profile of FIG. 6.

FIG. 7 is a block diagram of the exemplary steering wheel analyzer 124 of FIGS. 1, 2, 4, and 5. In the embodiment of FIG. 7, the steering wheel analyzer 124 includes a force determiner 700, a steering wheel position determiner 702, and a force profile generator 704. In the embodiment of FIG. 7, the force determiner 700 receives force information from the force sensor 106 and determines one or more amounts of force applied to the handle 400. The steering wheel position determiner 702 receives position information from the angular position sensor 108 and determines one or more positions of the steering wheel 102 based on the position information. The force profile generator 704 generates a force profile such as, for example, the force profile 602 of FIG. 6 based on the one or more amounts of force determined by the force determiner 700 and the one or more positions determined by the steering wheel position determiner 702.

While an exemplary implementation of the rotary force diagnostic tool 100 is shown in FIG. 7, the rotary force diagnostic tool 100 may be implemented in other ways without departing from the scope of this disclosure. For example, one or more of the components and/or devices shown in FIG. 7 may be combined, divided, re-arranged, omitted, eliminated and/or implemented in one or more additional and/or alternative ways. For example, the force sensor 106, the angular position sensor 108, the force determiner 700, the steering wheel position determiner 702, the force profile generator 704, and/or, more generally, the steering wheel analyzer 124 of FIG. 7 may be implemented via hardware, software, and/or firmware. The force sensor 106, the angular position sensor 108, the force determiner 700, the steering wheel position determiner 702, the force profile generator 704, and/or, more generally, the steering wheel analyzer 124 of FIG. 7 may be implemented by one or more circuits, programmable processors, application specific integrated circuits (ASICs), programmable logic devices (PLDs) and/or field programmable logic devices (FPLDs), and/or one or more additional and/or alternative devices. At least one of the force sensor 106, the angular position sensor 108, the force determiner 700, the steering wheel position determiner 702, the force profile generator 704, and/or, more generally, the steering wheel analyzer 124 of FIG. 7 includes a tangible and/or non-transitory computer readable medium such as a memory, DVD, CD, etc. storing software and/or firmware. The rotary force diagnostic tool of FIG. 7 may include one or more additional and/or alternative components and/or devices and/or may include more than one of any or all of the components and/or devices.

Figure 8:
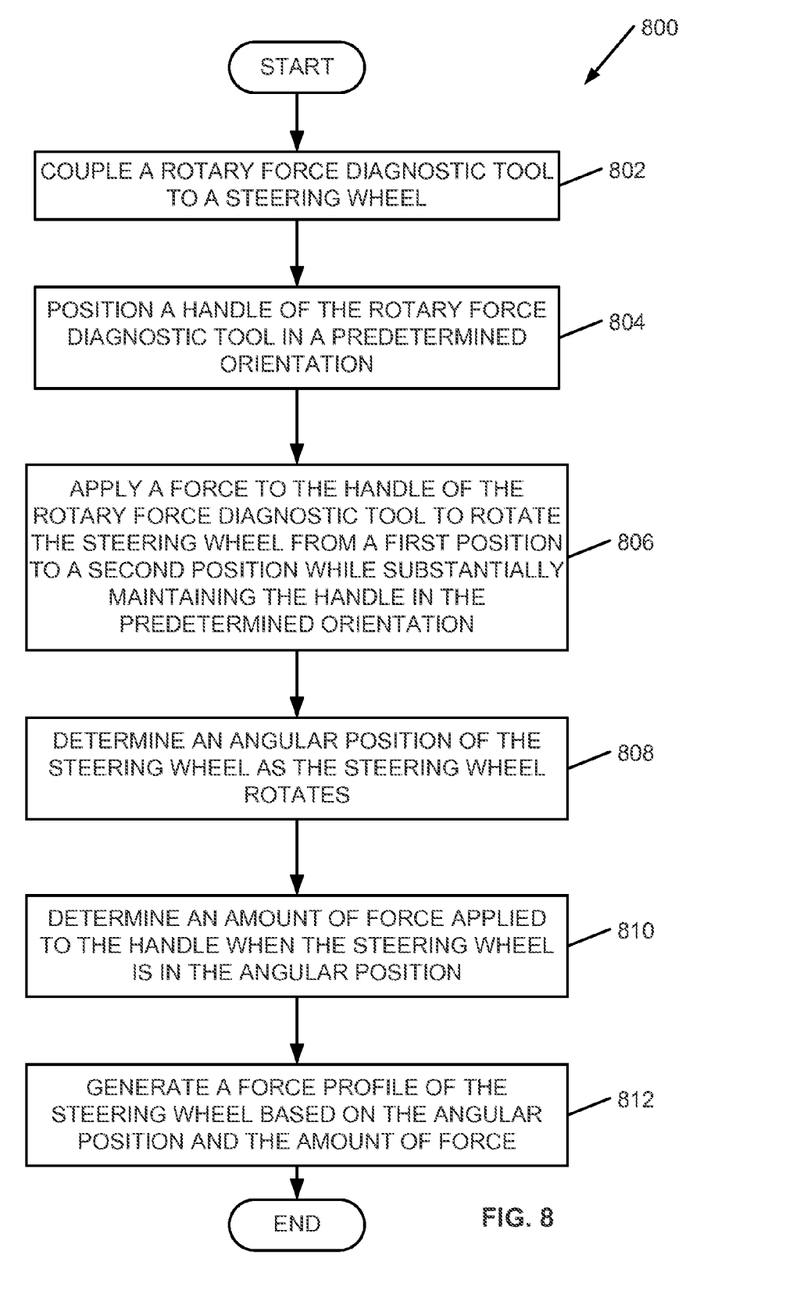
FIG. 8 is a flowchart representative of an exemplary method disclosed herein.

A flowchart representative of an exemplary method 800 to test a rotary component such as, for example, the steering wheel 102 of FIG. 5, is shown in FIG. 8. The method 800 of FIG. 8 may be implemented using a program for execution by one or more processors such as a processor 902 described in more detail below in conjunction with FIG. 9. However, the entire program and/or portions of the program could be executed by one or more additional and/or alternative devices. The program(s) may be stored on a tangible computer readable medium such as a CD-ROM, a hard drive, a flash drive, a digital versatile disk (DVD), or a memory employed by the processor(s). Further, although the method 800 of FIG. 8 is described with reference to the flowchart of FIG. 8, other methods of implementing the embodiments disclosed herein may be used. For example, the order of the blocks may be different, and/or some of the blocks may be different, eliminated, or combined.

As mentioned above, the exemplary method 800 of FIG. 8 may be implemented using computer readable instructions stored on a tangible computer readable medium. As used herein, a tangible computer readable medium is not a propagating signal. Additionally or alternatively, the method 800 of FIG. 8 may be implemented using computer readable instructions stored on a non-transitory computer readable medium such as a hard drive, a flash drive, a CD-ROM, and/or any other non-transitory storage media in which information is stored. As used herein, a non-transitory computer readable medium is not a propagating signal.

FIG. 8 is a flowchart representative of an exemplary method 800 to test a steering wheel such as, for example, the steering wheel 102 of FIGS. 1, 2, 4 and 5. In the embodiment of FIG. 8, the method 800 begins when the rotary force diagnostic tool 100 is coupled to the steering wheel 102 (block 802). For example, the fixture 104 may be removably coupled to the steering wheel 102 such that the second axis of rotation 116 of the handle 400 is substantially parallel to the first axis of rotation 114 of the steering wheel 102. The handle 400 of the rotary force diagnostic tool 100 is positioned in a predetermined orientation (block 804). For example, the handle 400 may be held by a user to position the handle 400 in an orientation in which the longitudinal axis 502 of the handle 400 is substantially vertical. In some embodiments, a reference position of the angular position sensor 108 is set when the handle 400 is in the predetermined orientation and/or the steering wheel 102 is in a predetermined position.

A force is applied to the handle 400 of the rotary force diagnostic tool 100 to rotate the steering wheel 102 from a first position to a second position while substantially maintaining the handle 400 in the predetermined orientation (block 806). For example, a user gripping the handle 400 may turn the steering wheel 102 in a first direction (e.g., clockwise) or an opposite second direction (e.g., counter-clockwise) from the neutral position to a position at a predetermined number of degrees and/or rotations away from the neutral position. In some embodiments, the user rotates the steering wheel 102 at a substantially constant angular speed such as, for example, ninety degrees per second.

As the steering wheel 102 moves from the first position to the second position, the angular position sensor 108 generates position information, and the force sensor 106 generates force information. The steering wheel position determiner 702 determines one or more angular positions of the steering wheel 102 as the steering wheel 102 rotates (block 808). In some embodiments, the steering wheel position determiner 702 determines the angular positions of the steering wheel 102 relative to the reference position. The force determiner 700 determines one or more amounts of force applied to the handle 400 when the steering wheel 102 is in the one or more angular positions (block 810). In some embodiments, the force profile generator 704 associates the angular positions with a respective amount of force applied to the handle 400 when the steering wheel 102 is at each of the angular positions. The force profile generator 704 generates a force profile of the steering wheel 102 based on the one or more angular positions and the one or more amounts of force (block 812). In some embodiments, the force profile is a illustrated via a graph such as, for example, the graph 600 of FIG. 6. In some embodiments, the force profile indicates whether the force applied to rotate the steering wheel 102 from the first position to the second position is substantially constant, increases, and/or decreases.

Figure 9:
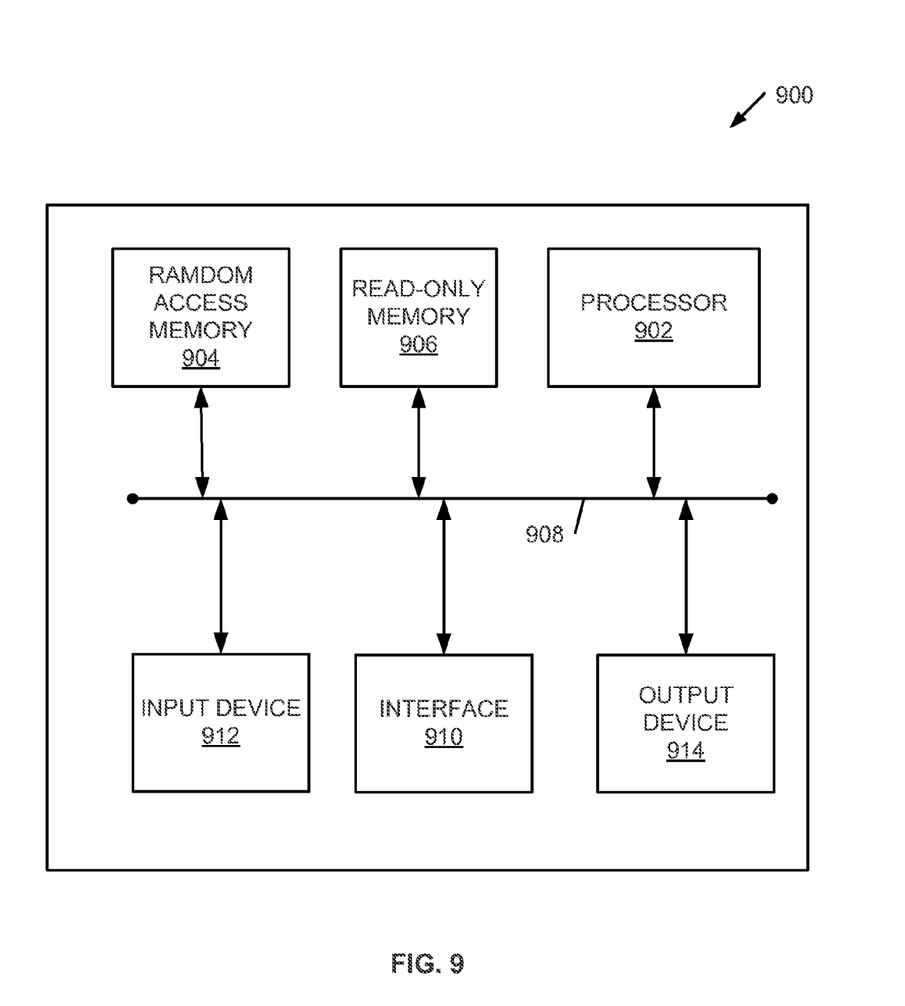
FIG. 9 is a processor platform that may be used to execute machine-readable instructions to implement the embodiments disclosed herein.

FIG. 9 is a schematic view of an exemplary processor platform 900 that may be used to execute instructions to implement the method 800 of FIG. 8 to implement the force sensor 106, the angular position sensor 108, the force determiner 700, the steering wheel position determiner 702, the force profile generator 704, and/or, more generally, the steering wheel analyzer 124 of FIG. 7. In some embodiments, the processor platform 900 is implemented via one or more general-purpose processors, processor cores, microcontrollers, and/or one or more additional and/or alternative processing devices.

The processor platform 900 of FIG. 9 includes a programmable, general purpose processor 902. The processor 902 executes coded instructions within a random access memory 904 and/or a read-only memory 906. The coded instructions may include instructions executable to implement the method 800 of FIG. 8. The processor 902 may be any type of processing device, such as a processor core, a processor and/or a microcontroller. The processor 902 is in communication with the random access memory 904 and the read-only memory 906 via a communications bus 908. The random access memory 904 may be implemented by any type of random access memory device such as, for example, DRAM, SDRAM, etc. The read-only memory 906 may be implemented by any type of memory device such as, for example, flash memory. In some embodiments, the processor platform 900 includes a memory controller to control access to the random access memory 904 and/or the read-only memory 906. The processor platform 900 of FIG. 9 includes an interface 910. The interface 910 may be implemented by an interface standard such as, for example, an external memory interface, a serial port, a general-purpose input/output, and/or any other type of interface standard. The processor platform 900 of FIG. 9 includes at least one input device 912 (e.g., a mouse, a keyboard, a touchscreen, a button, etc.) and at least one output device 914 (e.g., a display, speakers, etc.) coupled to the interface 910.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Additionally, the features of various implementing embodiments may be combined to form further embodiments. The word "exemplary" is used herein to mean serving as an example, instance, or illustration. Any aspect or embodiment described herein as "exemplary" is not to be construed as preferred or advantageous over other aspects or embodiments.

What is claimed is:

1. An apparatus, comprising:
a force sensor to be coupled to a rotary component which rotates about a first axis;
a handle rotatably coupled to the force sensor to enable an amount of force applied to the handle to be sensed by the force sensor, wherein the handle is rotatable about a second axis; and
an angular position sensor to sense an angular position of the handle relative to a portion of the force sensor, wherein the first axis and the second axis are not coaxial.

2. The apparatus of claim 1, wherein the force sensor comprises a load cell.

3. The apparatus of claim 1, wherein the angular position sensor comprises a rotary encoder.

4. The apparatus of claim 1, wherein the handle is a knob.

5. The apparatus of claim 1, wherein the angular position sensor is disposed in a space between the portion of the force sensor and the handle.

6. The apparatus of claim 1, wherein the force sensor includes a housing and a shaft coupled to the housing.

7. The apparatus of claim 6, wherein the handle is coupled to the shaft to rotate relative to the shaft.

8. The apparatus of claim 1 further comprising a fixture to couple the force sensor to the rotary component.

9. An apparatus, comprising:
a force sensor including a housing and a support coupled to the housing;
a handle rotatably coupled to the support, the handle spaced apart from the housing to define a space between the housing and the handle; and
an angular position sensor disposed in the space between the housing and the handle to sense relative rotation between the housing and the handle, wherein the angular position sensor includes a rotary encoder wheel and a rotary encoder sensor, wherein the output of the angular position sensor and the force sensor is used to determine the force applied to a rotary component at each angular position of the angular position sensor.

10. The apparatus of claim 9, further comprising a fastener rotatably coupling the handle to the support, the fastener defining an axis of rotation of the handle.

11. The apparatus of claim 1, wherein the angular position sensor is configured to sense an angular position of the handle about the second axis.

12. The apparatus of claim 9, wherein the rotary encoder wheel is coupled to a first one of the housing or the handle.

13. The apparatus of claim 12, wherein the rotary encoder sensor is coupled to a second one of the housing or the handle different than the first one of the housing or the handle.

14. The apparatus of claim 9 further comprising a fixture to support the force sensor, the handle, and the angular position sensor on a steering wheel.

15. A method, comprising:
coupling a diagnostic tool to a steering wheel that is rotatable about a first axis, the diagnostic tool including a force sensor, a handle rotatably coupled to the force sensor so as to rotate about a second axis which is not coaxial with the first axis, and an angular position sensor coupled to at least one of the handle or the force sensor;
positioning the handle in a predetermined orientation;
applying a force to the handle to rotate the steering wheel from a first position to a second position while substantially maintaining the handle in the predetermined orientation;
determining an angular position of the steering wheel based on position information generated by the angular position sensor as the steering wheel rotates from the first position to the second position; and
determining an amount of the force applied to the handle based on force information generated by the force sensor as the steering wheel rotates from the first position to the second position.

16. The method of claim 15, wherein coupling a diagnostic tool to a steering wheel comprises supporting the force sensor, the handle, and the angular position sensor on the steering wheel.

17. The method of claim 16, wherein coupling a diagnostic tool to a steering wheel comprises coupling the diagnostic tool to the steering wheel such that said second axis of rotation of the handle is substantially parallel to said first axis of rotation of the steering wheel.

18. The method of claim 15, wherein determining an amount of the force applied to the handle comprises:
   determining the amount of the force applied to the handle when the steering wheel is in the angular position; and
associating the amount of the force with the angular position.

19. The method of claim 18 further comprising generating a force profile of the steering wheel based on the amount of the force and the angular position.

20. The method of claim 15, wherein applying a force to the handle to rotate the steering wheel from a first position to a second position comprises applying the force to the handle to rotate the steering wheel from the first position to the second position at a substantially constant angular speed.

21. The apparatus of claim 9, wherein the angular position sensor is configured to sense an angular position of the handle about a first axis, wherein the force sensor is configured to detect a force value at each angular position of the handle.

* * * * *